US009622176B2

(12) United States Patent
Sathy et al.

(10) Patent No.: US 9,622,176 B2
(45) Date of Patent: Apr. 11, 2017

(54) PACKET FILTERING FOR SAVING POWER AT A USER EQUIPMENT

(71) Applicant: QUALCOMM Incorporated, San Diego, CA (US)

(72) Inventors: Simi Anand Sathy, Hyderabad (IN); Thomas Matthew Rebman, Boulder, CO (US); Uday Kumar Arava, Hyderabad (IN); Smita Jayaram, San Diego, CA (US); Vidula Rajeev Kurundkar, Hyderabad (IN); Yeshwanth Kumar Terala, Hyderabad (IN); Sivakanth Reddy Vaka, Hyderabad (IN); Susheel Kumar Yadav Yadagiri, San Diego, CA (US); Gopinath Venkata Naga Sesha Kilambi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 14/705,632

(22) Filed: May 6, 2015

(65) Prior Publication Data
US 2015/0373644 A1 Dec. 24, 2015

Related U.S. Application Data

(60) Provisional application No. 62/015,873, filed on Jun. 23, 2014.

(51) Int. Cl.
*G06F 15/16* (2006.01)
*H04W 52/02* (2009.01)
*H04L 12/823* (2013.01)

(52) U.S. Cl.
CPC ......... *H04W 52/0222* (2013.01); *H04L 47/32* (2013.01); *H04W 52/0238* (2013.01); *H04W 52/0264* (2013.01); *Y02B 60/50* (2013.01)

(58) Field of Classification Search
CPC ........... H04L 29/0653; H04L 29/06585; H04L 69/22; H04L 69/32; H04L 69/12;
(Continued)

(56) References Cited

U.S. PATENT DOCUMENTS 7,133,400 B1 * 11/2006 Henderson .............. H04L 29/06
370/389
2006/0182143 A1 * 8/2006 Lu ....................... H04L 63/0227
370/469

(Continued)

FOREIGN PATENT DOCUMENTS

WO WO-2013/155185 A1 10/2013

OTHER PUBLICATIONS

International Search Report and Written Opinion—PCT/US2015/029609—ISA/EPO Jul. 20, 2015. (70 total pages).

*Primary Examiner* — Mohamed Kamara
(74) *Attorney, Agent, or Firm* — Arent Fox LLP

(57) ABSTRACT

The present disclosure presents a method and an apparatus for packet filtering to save power at a user equipment (UE). For example, the disclosure presents a method for receiving a packet filtering configuration message, at a modem processor (MP) of the UE, from an application processor (AP) in communication with the MP, wherein the packet filtering configuration message includes one or more packet filtering rules for filtering packets associated with one or more applications, configuring a packet filter at the MP based at least on the one or more packet filtering rules received in the packet filtering configuration message, and enabling the configured packet filter at the MP in response to receiving an indication from the AP that the AP entered a low power or sleep mode, wherein the enabled packet filter allows or drops a packet based on the packet filtering rules. As such, packet filtering to save power at UE may be achieved.

28 Claims, 8 Drawing Sheets

(58) Field of Classification Search
CPC . H04L 45/745; H04L 49/309; H04L 12/2605; H04B 1/0017; H04B 1/0042; H03H 17/00
See application file for complete search history.

(56) References Cited

U.S. PATENT DOCUMENTS

| | | | |
|---|---|---|---|
| 2010/0106796 A1* | 4/2010 | Van Gassel | G06F 9/542 709/207 |
| 2010/0192218 A1* | 7/2010 | Shah | H04L 69/22 726/13 |
| 2011/0194474 A1 | 8/2011 | Kim et al. | |
| 2013/0316688 A1 | 11/2013 | Skog et al. | |
| 2013/0329732 A1* | 12/2013 | Vyas | H04L 45/745 370/392 |

* cited by examiner

PACKET FILTERING FOR SAVING POWER AT A USER EQUIPMENT

CLAIM OF PRIORITY

The present application for patent claims priority to U.S. Provisional Patent Application No. 62/015,873, filed Jun. 23, 2014, entitled "Packet Filtering Mechanism for Saving Power at a User Equipment (UE)," which is assigned to the assignee hereof, and hereby expressly incorporated by reference herein.

BACKGROUND

Aspects of the present disclosure relate generally to wireless communication systems, and more particularly, to saving power or reducing power consumption at a user equipment (UE).

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

When a user equipment (UE) is in a packet switched (PS) data call, the UE is assigned a private or a public Internet Protocol (IP) address by a network entity. If a public IP address is assigned to the UE, the UE's vulnerability to TCP connection request (SYN) attacks increase and spurious/unwanted packets are received on a downlink (DL) at the UE. This may use battery power at the UE and may result in reduced talk and/or hold time at the UE. Additional examples of spurious/unwanted packets include unsolicited ping responses received from the network entity, etc. For example, a modem processor (MP) may be unaware of applications that are active on an application processor (AP) and the MP may send (e.g., transmit, forward, etc.) spurious/unwanted packets from the MP to the AP and wake up the AP from sleep (e.g., if the AP is in a sleep or a power saving mode) and consume valuable battery power at the UE.

Therefore, there is a desire for packet filtering at a UE to save power.

SUMMARY

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present disclosure presents an example method and apparatus for packet filtering to save power at a user equipment (UE). For example, the present disclosure presents an example method for receiving a packet filtering configuration message, at a modem processor (MP) of the UE, from an application processor (AP) in communication with the MP, wherein the packet filtering configuration message includes one or more packet filtering rules for filtering packets associated with one or more applications, configuring a packet filter at the MP based at least on the one or more packet filtering rules received in the packet filtering configuration message, and enabling the configured packet filter at the MP in response to receiving an indication from the AP that the AP entered a low power or sleep mode, wherein the enabled packet filter allows or drops a packet based on the packet filtering rules.

Additionally, the present disclosure presents an example apparatus for packet filtering to save power at a user equipment (UE) that may include means for receiving a packet filtering configuration message, at a modem processor (MP) of the UE, from an application processor (AP) in communication with the MP, wherein the packet filtering configuration message includes one or more packet filtering rules for filtering packets associated with one or more applications, means for configuring a packet filter at the MP based at least on the one or more packet filtering rules received in the packet filtering configuration message, and means for enabling the configured packet filter at the MP in response to receiving an indication from the AP that the AP entered a low power or sleep mode, wherein the enabled packet filter allows or drops a packet based on the packet filtering rules.

In a further aspect, the presents disclosure presents an example non-transitory computer readable medium storing computer executable code for packet filtering to save power at a user equipment (UE) that may include code for receiving a packet filtering configuration message, at a modem processor (MP) of the UE, from an application processor (AP) in communication with the MP, wherein the packet filtering configuration message includes one or more packet filtering rules for filtering packets associated with one or more applications, code for configuring a packet filter at the MP based at least on the one or more packet filtering rules received in the packet filtering configuration message, and code for enabling the configured packet filter at the MP in response to receiving an indication from the AP that the AP entered a low power or sleep mode, wherein the enabled packet filter allows or drops a packet based on the packet filtering rules.

Furthermore, in an aspect, the present disclosure presents an example user equipment (UE) for wireless communications that may include a packet filter configuration message receiving component to receive a packet filtering configuration message, at a modem processor (MP) of the UE, from an application processor (AP) in communication with the MP, wherein the packet filtering configuration message includes one or more packet filtering rules for filtering packets associated with one or more applications, a packet filter configuration component to configure a packet filter at the MP based at least on the one or more packet filtering rules received in the packet filtering configuration message, and a packet filter enabling component to enable the configured packet filter at the MP in response to receiving an indication from the AP that the AP entered a low power or sleep mode, wherein the enabled packet filter allows or drops a packet based on the packet filtering rules.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, as used herein, a component may be one of the parts that make up a system, may be hardware or software, and may be divided into other components.

The present disclosure provides a method and an apparatus for packet filtering to save power at a user equipment (UE) that includes configuring a packet filter at a modem processor (MP) based on packet filtering rules received in a packet filtering configuration message from an application processor (AP). The method and apparatus further includes enabling the packet filter configured at the MP after receiving an indication from the AP that the AP entered a low power or sleep mode.

Figure 1:
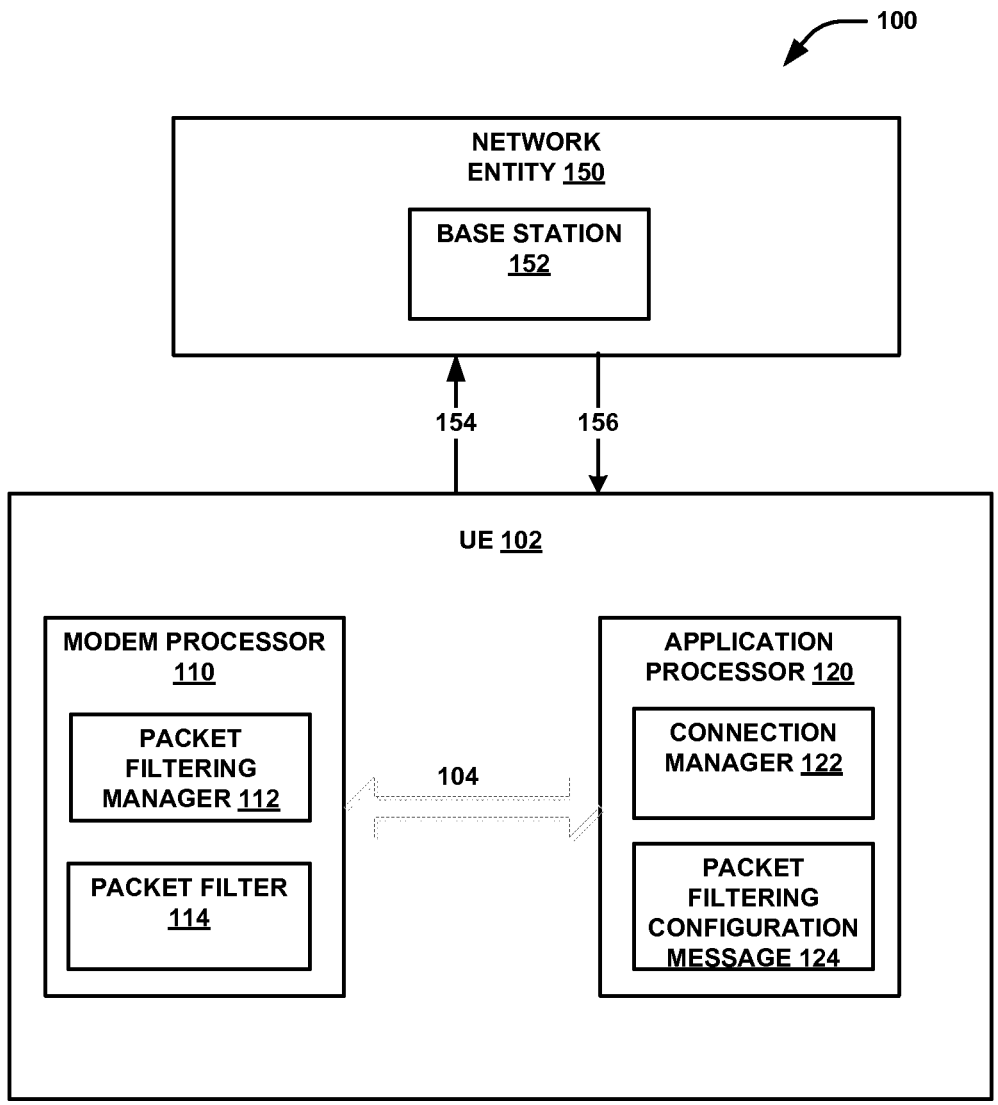
FIG. 1 is a block diagram illustrating an example wireless system in aspects of the present disclosure.

Referring to FIG. 1, a wireless communication system 100 is illustrated that facilitates packet filtering for saving power at a user equipment (UE). For example, in an aspect, system 100 includes a UE 102 that may communicate with a network entity 150 and/or a base station 152 via one or more over-the-air links 154 and/or 156. For example, UE 102 may communicate with network entity 150 and/or base station 152 on an uplink (UL) 154 and/or a downlink (DL) 156. The UL 154 is generally used for communication from UE 102 to base station 152 and/or the DL 156 is generally used for communication from base station 152 to UE 102.

In an aspect, network entity 150 may include one or more of any type of network components, for example, an access point, including a base station (BS) or Node B or eNode B or a femto cell, a relay, a peer-to-peer device, an authentication, authorization and accounting (AAA) server, a mobile switching center (MSC), a radio network controller (RNC), etc., that can enable UE 102 to communicate and/or establish and maintain wireless communication links 154 and/or 156, which may include a communication session over a frequency or a band of frequencies that form a communication channel, to communicate with network entity 150 and/or base station 152. In an additional aspect, for example, base station 152 may operate according to a radio access technology (RAT) standard, e.g., GSM, CDMA, W-CDMA, HSPA or a long term evolution (LTE).

In an additional aspect, UE 102 may be a mobile apparatus and may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In an aspect, UE 102 and/or modem processor (MP) 110 may be configured to include a packet filtering manager 112 to receive a packet filtering configuration message 124 from an application processor (AP) 120 and/or connection manager 122. The packet filtering configuration message 124 may include one or more packet filtering rules for filtering packets associated with one or more applications running on AP 120. Once MP 110 and/or packet filtering manager 112 receives packet filtering configuration message 124, MP 110 and/or packet filtering manager 112 may configure a packet filter 114 at MP 110 based on the packet filtering rules in the package filtering configuration message 124 and enable the configured packet filter at MP 110 in response to receiving an indication from AP 120 and/or connection manager 122 that AP 120 has entered a lower power or sleep mode.

In an additional aspect, MP 110 and/or packet filtering manager 112 may disable the packet filter when a packet is allowed to pass through a packet filter that is enabled. In a further additional aspect, MP 110 and/or packet filtering manager 112 may allow a packet to pass from MP 110 to AP 120 when the packet satisfies at least one rule of the one or more packet rules or drop a packet at MP 110 when the packet fails to satisfy at least one rule of the one or more packet filtering rules of the packet filter that is enabled. Additional aspects, which may be performed in combination with the above aspects or independently thereto, are discussed below and may lead to further power savings at UE 102.

Figure 2:
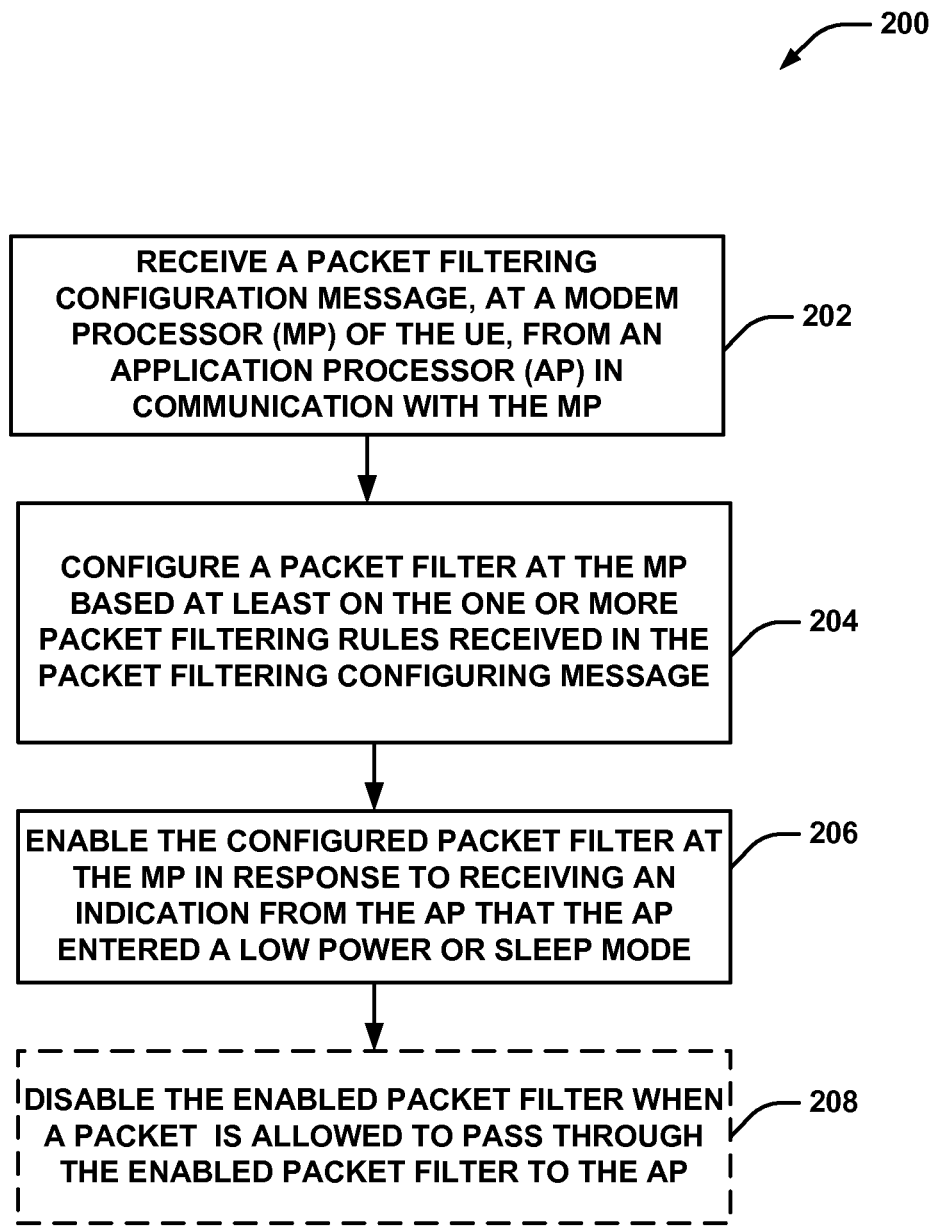
FIG. 2 is a flow diagram illustrating aspects of an example method in aspects of the present disclosure.

FIG. 2 illustrates an example methodology 200 of packet filtering for saving power at a UE.

In an aspect, at block 202, methodology 200 may include receiving a packet filtering configuration message, at a modem processor (MP) of the UE, from an application processor (AP) in communication with the MP. For example, in an aspect, UE 102, MP 110, and/or packet filtering manager 112 may include a specially programmed processor module, or a processor executing specially programmed code stored in a memory, to receive a packet filtering configuration message 124 at modem MP 110 of UE 102 from AP 120 in communication with the MP. In an aspect, as discussed below with regard to FIG. 3, packet filtering manager 112 may include a packet filter configuration message receiving component 302 to perform this functionality.

For example, in an aspect, packet filtering manager 112 may receive packet filtering configuration message 124 from AP 120 and/or connection manager 122. In an aspect, connection manager 122 may monitor (or track) applications on AP 120 that may be in an active (e.g., running) or inactive state at AP 120 and/or the types of packets (e.g., transmission control protocol (TCP) or user datagram protocol (UDP) packets) each of the applications on AP 120 are interested in receiving (or transmitting). In an additional aspect, connection manager 122 may identify when AP 120 has completed receiving data (e.g., packets) from network entity 150 and/or completed transmitting data (e.g., packets) to network entity 150 based on, e.g., whether a TCP/UDP socket associated with an application that is receiving/transmitting the packets is closed. For example, in an aspect, connection manager 122 may identify that AP 120 has finished receiving/transmitting packets associated with an email application when UDP port 80 is closed (e.g., sockets associated with TCP ports 25 or 587 are closed).

In an aspect, connection manager 122 may create (or configure, define, etc.) packet filtering configuration message 124 based on information available at AP 120 from the monitoring or tracking of applications at AP 120 as described above. In an additional aspect, connection manager 122 may create (or configure, define, etc.) packet filtering rules from the monitoring or tracking of applications at AP 120 for creating packet filtering configuration message 124. For instance, the packet filtering rules may be determined based on, for example, Internet Protocol (IP) source address, IP destination address, TCP source port, TCP destination port, UDP source port, UDP destination port, etc. of the applications at AP 120.

An example of packet filtering rules included in a packet filtering configuration message 124 is shown in Table 1 below.

TABLE 1

Packet Filtering Rules

| Rule | Source Address | Destination Address | Action |
|------|----------------|---------------------|--------|
| A    | 10.0.0.0       | 172.16.6.0          | Pass   |
| B    | 10.1.99.0/24   | 172.16.0.0/16       | Pass   |

In an additional or optional aspect, the packet filtering rules may be associated with one or more applications at AP 120 depending on the how the packet filtering rules are created (or defined) at AP 120. For example, a packet filtering rule may be associated with more than one application if the packet filtering rule is defined to cover a range of IP addresses, a range of TCP ports, and/or a range of UDP ports. In an additional or optional aspect, the applications at AP 120 may share a packet switched (PS) data session or the applications may have their own data sessions, and connection manager 122 may create packet filtering rules at AP 120 accordingly.

In an aspect, when connection manager 122 creates packet filtering configuration message 124, AP 120 and/or connection manager 122 may send the packet filtering configuration message 124 to MP 110 and/or packet filtering manager 112. That is, MP 110 and/or packet filtering manager 112 may receive the packet filtering configuration message 124 from AP 120 and/or connection manager 122 which may include one or more packet filtering rules for creating (or defining) a packet filter 114 at MP 110.

In an additional aspect, UE 102 may include AP 110 and MP 120 in a single or multi-processor system. That is, AP 110 and MP 120 may be a part of a single processor system (e.g., MP 110 and AP 120 co-exist on the same processor) or a multi-processor system (e.g., MP 110 and MP 120 exist on different processors). For example, AP 110 and MP 120 may be included on a system on a chip (SOC).

In an aspect, packet filtering manager 112 may be configured to receive packet filtering configuration message 124 from AP 120 via interface 104. The interface 104 may be used for communication between MP 110 and AP 120 to install (or configure, re-configure, delete, etc.) filters at MP 110, enabling/disabling of the packet filter, and/or configuring auto exit mode of packet filter 114.

In an aspect, more than one PS call may be present at UE 102. For instance, different applications may be using different PS data calls, e.g., data calls associated with the applications may be originating from or terminating to a different access point name (APN). In such an aspect, packet filtering manager 112 may configure packet filter 114 with the packet filtering rules associated with multiple PS calls or packet filtering manager 112 may configure multiple packet filters to support multiple PS calls.

In an additional aspect, connection manager 122 may send an updated (or revised) or a new packet filtering configuration message with new filtering rules based on monitoring/tracking of the applications at AP 120. For instance, new filtering rules may be added (e.g., started monitoring a new application at AP 110), existing filtering rules may be deleted (e.g., stopped monitoring or tracking an application), or updated based on the monitoring of the applications at AP 110.

In an aspect, at block 204, methodology 200 may include configuring a packet filter at the MP based at least on the one or more packet filtering rules received in the packet filtering configuration message. For example, in an aspect, UE 102, MP 110, and/or packet filtering manager 112 may include a specially programmed processor module, or a processor executing specially programmed code stored in a memory, to configure packet filter 114 at MP 110 based at least on the one or more packet filtering rules received in packet filtering configuration message 124. In an aspect, as discussed below with regard to FIG. 3, packet filtering manager 112 may include a packet filter configuration component 304 to perform this functionality.

For instance, packet filtering manager 112 may create, install, or configure packet filter 114 based on the packet filtering rules included in packet filtering configuration message 124 that is received from AP 120 and/or connection manager 122. In an additional aspect, MP 110, and/or packet filtering manager 112 may re-configure (e.g., re-install or update) packet filter 114 based on updated packet filtering rules received from AP 120 and/or connection manager 122. For example, packet filtering manager 112 may re-configure packet filter 114 configured at MP 110 based on updated packet filtering rules received from AP 120 and/or connection manager which may be further based on monitoring/tracking of applications at AP 120. In an optional aspect, the updated packet filtering rules may be received at MP 110 and/or packet filtering manager 112 via an updated, revised, or a new packet filtering configuration message. In an aspect, a messaging mechanism (e.g., interface) may exist for communication between AP 120 and MP 110 and/or for configuring, enabling, and/or disabling, packet filter at MP 110. In an example, a proprietary messaging protocol, e.g., Qualcomm mobile site modem (MSM) interface (QMI) protocol may be used for communication between AP 120 and MP 110 and/or for configuring, enabling, and/or disabling, packet filter at MP 110.

For instance, AP 120 and/or connection manager 122 may send an updated packet filtering configuration message to MP 110 and/or packet filtering manager 112 to update the packet filtering rules at MP 110 and/or packet filtering manager 112 to re-configure/update the packet filters to determine which packets may be allowed to pass from MP 110 to AP 120. In an additional aspect, although packet filter 114 may be configured at MP 110, packet filter 114 may not be enabled until a message (or some form of indication) is received from AP 120 and/or connection manager 122 enabling the packet filter. That is, the packet filter may not be filtering messages if packet filter 114 is not enabled (even if the packet filter is installed). This allows pre-configuring a packet filter 114 at MP 110 to minimize the delay associated with configuring a packet filter and enable the configured packet filter at MP 110 as needed. In an additional aspect, packet filtering manager 112 may configure multiple packet filters at MP 110 if multiple PS calls are set up at UE 102 as described above.

In an aspect, at block 206, methodology 200 may include enabling the configured packet filter at the MP in response to receiving an indication from the AP that the AP entered a low power or sleep mode. For example, in an aspect, UE 102, MP 110, and/or packet filtering manager 112 may include a specially programmed processor module, or a processor executing specially programmed code stored in a memory, to enable the configured packet filter (e.g., packet filter 114) at MP 110 in response to receiving an indication from AP 120 that the AP entered a low power or sleep mode. For instance, MP 110 and/or packet filtering manager 112 may receive the indication (e.g., a message) from AP 120 and/or connection manager 122 via interface 104. In an aspect, as discussed below with regard to FIG. 3, packet filtering manager 112 may include a packet filter enabling component 306 to perform this functionality.

For instance, AP 120 may be considered as entering a low power or sleep mode based on whether the display (e.g., display screen) of UE 102 is turned OFF or UE enters display OFF state, and there is no data being transferred between network entity 150 and UE 102 during a call (e.g., a data call may be in progress but no active data transfer is occurring between network entity 150 and UE 102). In an additional aspect, AP 120 may be considered as entering a low power or sleep mode based on a signaling connection release triggered to MP 110, packet filtering manager 112, and/or network entity 150.

In an additional aspect, AP 120 may come out of low power or sleep mode due to a time bound operation or user intervention (e.g., user of UE 102) to send packets on a uplink (UL) to network entity 150, for example, via link 154, from UE 102. Further, AP 120 may come out of low power or sleep mode when a DL packet has passed through packet filter 114 at MP 110 (e.g., the DL packet may a valid packet transmitted to AP 110 via packet filter 114).

In an additional or optional aspect, at block 208, methodology 200 may optionally include disabling the enabled packet filter when a packet is allowed to pass through the enabled packet filter to the AP. For example, in an aspect, UE 102, MP 110, and/or packet filtering manager 112 may include a specially programmed processor module, or a processor executing specially programmed code stored in a memory, to disable the enabled packet filter (e.g., packet filter 114) when a packet is allowed to pass through the enabled packet filter to AP 120. In an aspect, as discussed below with regard to FIG. 3, packet filtering manager 112 may include a packet filter disabling component 308 to perform this functionality.

For instance, MP 110 and/or packet filtering manager 112 may disable packet filter 114 when AP 120 wakes up from the lower power or sleep mode due to a time bound operation or user intervention (e.g., user of UE 102) to send packets on a uplink (UL) to network entity, for example, via link 154, from UE 102 to network entity 150.

In an additional aspect, when network entity 150 establishes a connection (e.g., a network initiated connection) for sending a spurious or unwanted packet (e.g., an unsolicited packet or a packet any of the applications are not interested) to UE 102, MP 110 and/or packet filtering manager 112 may drop the spurious or unwanted packet based on the packet filtering rules at packet filter 114. That is, when packet filter 114 is enabled and MP 110 receives a packet (e.g., from network entity 150) that fails to satisfy (e.g., meet) at least one packet filtering rule configured at MP 110, the packet is dropped at MP 110. The dropping of the packet allows the AP 120 to continue its sleep mode. That is, AP 120 will not unnecessarily wake up from its sleep mode, there by saving power at the UE. Additionally, packet filtering manager 112 may start (or initiate) two timers "T1" and "T2" at MP 110. For instance, in an aspect, the T1 timer may be used for computing a time period of data inactivity after an unwanted packet received over a connection (or data session) is dropped at MP 110 and the T2 timer may be used for computing a time period after establishing the data session between MP 110 and network entity 150 for receiving the unwanted packet.

For example, packet filtering manager 112 may configure the T1 timer to release the connection (e.g., release RF resources) established between network entity 150 and/or MP 110 (e.g., for transmitting the spurious or unwanted packet) as soon as the spurious or the unwanted packet is transmitted to UE 102 and/or MP 110, for example, upon expiration of the T1 timer. In an additional aspect, packet filtering manager 112 may configure the T2 timer to start when network entity 150 establishes a connection with MP 110 for sending a spurious/unwanted packet to UE 102 and release the connection (e.g., signaling connection) upon expiration of the T2 timer. For example, the T2 timer may apply in a scenario where network entity 150 establishes connection with MP 110 for sending a spurious/unwanted packet to UE 102, but the spurious/unwanted packet is lost during the transmission and does not reach UE 102 and/or MP 110. In an aspect, this may avoid (or reduce) the number of occurrences where the connection may remain open till network entity 150 releases the connection which may be considerably longer in duration than the T2 timer resulting in unnecessary consumption of battery power at the UE.

For instance, in an aspect, the T1 timer may be configured to a value which is less than the value configured for the T2 timer. For example, the network timer for release of signaling connection may be set to 20 seconds, the T1 timer may be set to 1 second, and/or the T2 timer may be set to 10 seconds. In this example aspect, when a connection between UE 102 and network entity 150 is set up for transmitting a spurious or unwanted packet from network entity 150 to UE 102, the network connection may be released (e.g., release of radio frequency (RF) resources) within one second of dropping of the spurious/unwanted packet at MP 110 and/or packet filtering manager 112, and the connection may be tore down (e.g., termination of the data session) within 10 seconds (instead of waiting for 20 seconds) resulting in power savings at the UE. Thus, the above described methodology saves power at the UE.

In an additional or optional aspect, packets may be allowed to pass from MP 110 to AP 120 when the packet satisfies at least one packet filtering rules configured at packet filter 114. For example, if a packet received from network entity 150 satisfies one or more rules at packet filter 114, packet filtering manager 112 transmits the packet to AP 110. In contrast, packets are dropped at MP 110 when a packet fails to satisfy or meet at least one of the packet filtering rules configured at packet filter 114. The allowing/dropping of packets works for all types of RATs with active data transfer using a PS call. Additionally, connection manager 122 may trigger MP 110 into dormant mode based on various timers which may be configured based on UE display timer, data activity timer, priority data usage timer, etc.

Thus, as described above, packet filtering to save power at a UE may be achieved.

Figure 3:
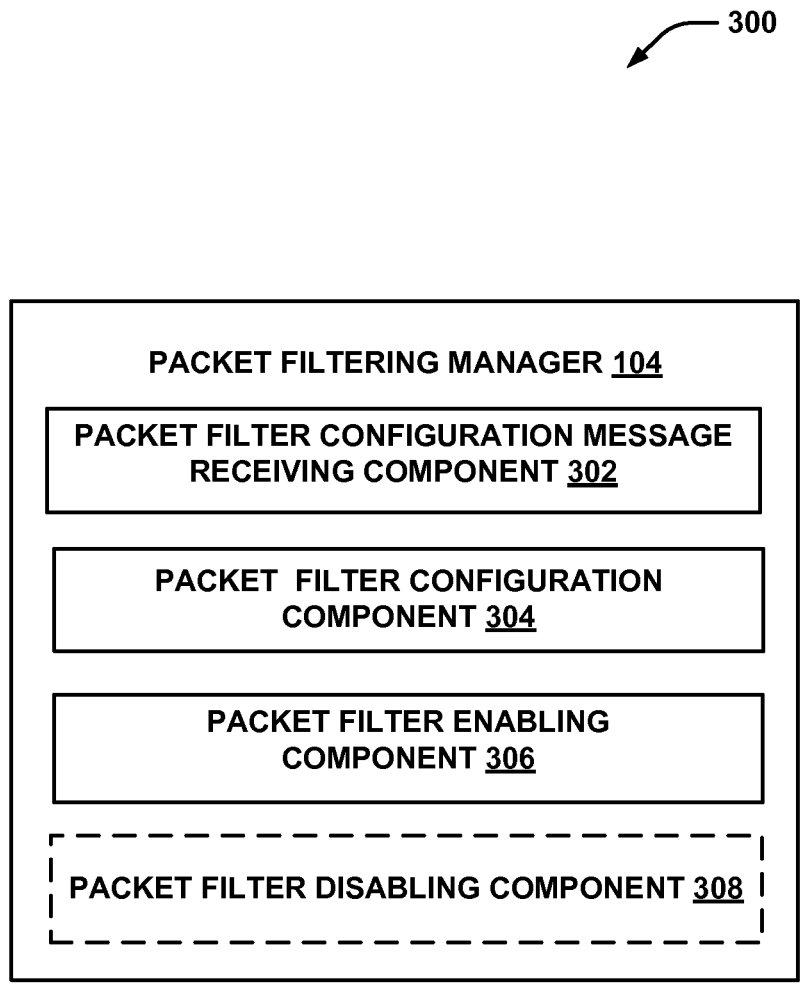
FIG. 3 is a block diagram illustrating an example packet filtering manager in aspects of the present disclosure.

Referring to FIG. 3, illustrated are an example packet filtering manager 112 and various sub-components for packet filtering to save power at a user equipment (UE). In an example aspect, packet filtering manager 112 may be configured to include the specially programmed processor module, or the processor executing specially programmed code stored in a memory, in the form of a packet filter configuration message receiving component 302, a packet filter configuration component 304, a packet filter enabling component 306, and/or a packet filter disabling component 308, as in specially programmed computer readable instructions or code, firmware, hardware, or some combination thereof. In an aspect, a component may be one of the parts that make up a system, may be hardware or software, and may be divided into other components.

In an aspect, packet filtering manager 112 and/or packet filter configuration message receiving component 302 may be configured to receive a packet filtering configuration message, at a modem processor (MP) of the UE. For example, in an aspect, packet filter configuration message receiving component 302 may be configured to receive packet filtering configuration message 124 from AP 120 via interface 104. The interface 104 may be used for communication between MP 110 and AP 120 to install (or configure, re-configure, delete, etc.) packet filter 114 at MP 110, enabling/disabling of the packet filter, and/or configuring auto exit mode of packet filter 114.

For instance, in an aspect, packet filtering manager 112 may configure packet filter 114 to stop filtering packets (e.g., disabling of packet filter 114) at MP 110 upon detecting that valid packets are being received at packet filter 114. For example, an incoming packet may be considered as a valid packet based on its source or destination address, type of packet, and/or the intended application. If the packet filter 114 is not disabled upon receiving of a valid packet (e.g., valid DL packet) when, the throughput at UE 102 may degrade.

In an aspect, packet filtering manager 112 and/or packet filter configuration component 304 may be configured to configure a packet filter at the MP based at least on the one or more packet filtering rules received in the packet filtering configuration message. For example, in an aspect, packet filter configuration component 304 may be configured to configure (e.g., install) a packet filter 114 at MP 110 based at least on the one or more packet filtering rules received in the packet filtering configuration message 124 from AP 120 and/or connection manager 122.

In an aspect, packet filtering manager 112 and/or packet filter enabling component 306 may be configured to enable the configured packet filter at the MP in response to receiving an indication from the AP that the AP entered a low power or sleep mode. For example, in an aspect, packet filter enabling component 306 may be configured to enable the configured packet filter (e.g., packet filter 114) in response to receiving an indication from AP 120 and/or connection manager 122 that AP 120 entered a low power or sleep mode.

In an optional aspect, packet filtering manager 104 and/or packet filter disabling component 308 may be configured to disable the enabled packet filter when a packet is allowed to pass through the enabled packet filter to the AP. For example, in an aspect, packet filter disabling component 308 may be configured to disabled the enabled packet filter (e.g., packet filter 114) when a packet is allowed to pass through the enabled packet filter e.g., packet filter 114) to AP 120.

Figure 4:
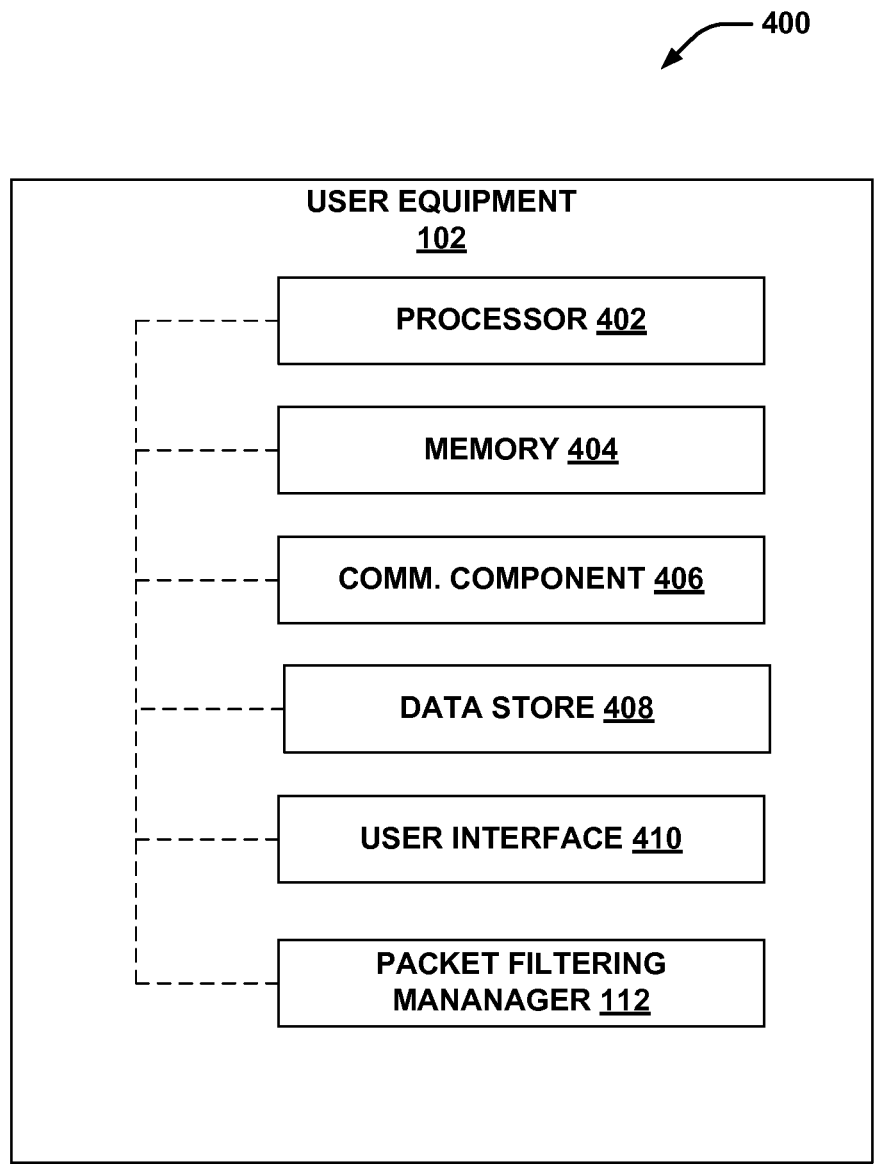
FIG. 4 is a block diagram illustrating aspects of an example user equipment including a packet filtering manager according to the present disclosure.

As illustrated in FIG. 4, UE 102 may include a processor 402, memory 404, communications component 406, data store 408, user interface 410, and packet filtering manager 112. Packet filtering manager 112, may be implemented partially or fully in a specially programmed or configured computer device to perform the functions described herein. Further, in an implementation, UE 102 may include packet filtering manager 112 and its sub-components, including packet filter configuration message receiving component 302, packet filter configuration component 304, packet filter enabling component 306, and/or a packet filter disabling component 308 (FIG. 3), in specially programmed computer readable instructions or code, firmware, hardware, or some combination thereof. In an aspect, for example as represented by the dashed lines, packet filtering manager 112 may be implemented or executed using one or any combination of processor 402, memory 404, communications component 406, and data store 408. For example, packet filtering manager 112 may be defined or otherwise programmed as one or more processor modules of processor 402. Further, for example, packet filtering manager 112 may be defined as a computer-readable medium (e.g., a non-transitory computer-readable medium) stored in memory 404 and/or data store 408 and executed by processor 402. Moreover, for example, inputs and outputs relating to operations of packet filtering manager 112 may be provided or supported by communications component 406, which may provide a bus between the components of computer device 400 or an interface to communication with external devices or components.

UE 102 may include a processor 402 specially configured to carry out processing functions associated with one or more of components and functions described herein. Processor 402 can include a single or multiple set of processors or multi-core processors. Moreover, processor 402 can be implemented as an integrated processing system and/or a distributed processing system.

User equipment 102 further includes a memory 404, such as for storing data used herein and/or local versions of applications and/or instructions or code being executed by processor 402, such as to perform the respective functions of the respective entities described herein. Memory 404 can include any type of memory usable by a computer, such as random access memory (RAM), read only memory (ROM), tapes, magnetic discs, optical discs, volatile memory, non-volatile memory, and any combination thereof.

Further, user equipment 102 includes a communications component 406 that provides for establishing and maintaining communications with one or more parties utilizing hardware, software, and services as described herein. Communications component 406 may carry communications between components on user equipment 102, as well as between user and external devices, such as devices located across a communications network and/or devices serially or locally connected to user equipment 102. For example, communications component 406 may include one or more buses, and may further include transmit chain components and receive chain components associated with a transmitter and receiver, respectively, or a transceiver, operable for interfacing with external devices.

Additionally, user equipment 102 may further include a data store 408, which can be any suitable combination of hardware and/or software, that provides for mass storage of information, databases, and programs employed in connection with aspects described herein. For example, data store 408 may be a data repository for applications not currently being executed by processor 402.

User equipment 102 may additionally include a user interface component 410 operable to receive inputs from a user of user equipment 102, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

The various concepts presented throughout this disclosure may be implemented across a broad variety of telecommunication systems, network architectures, and communication standards.

Figure 5:
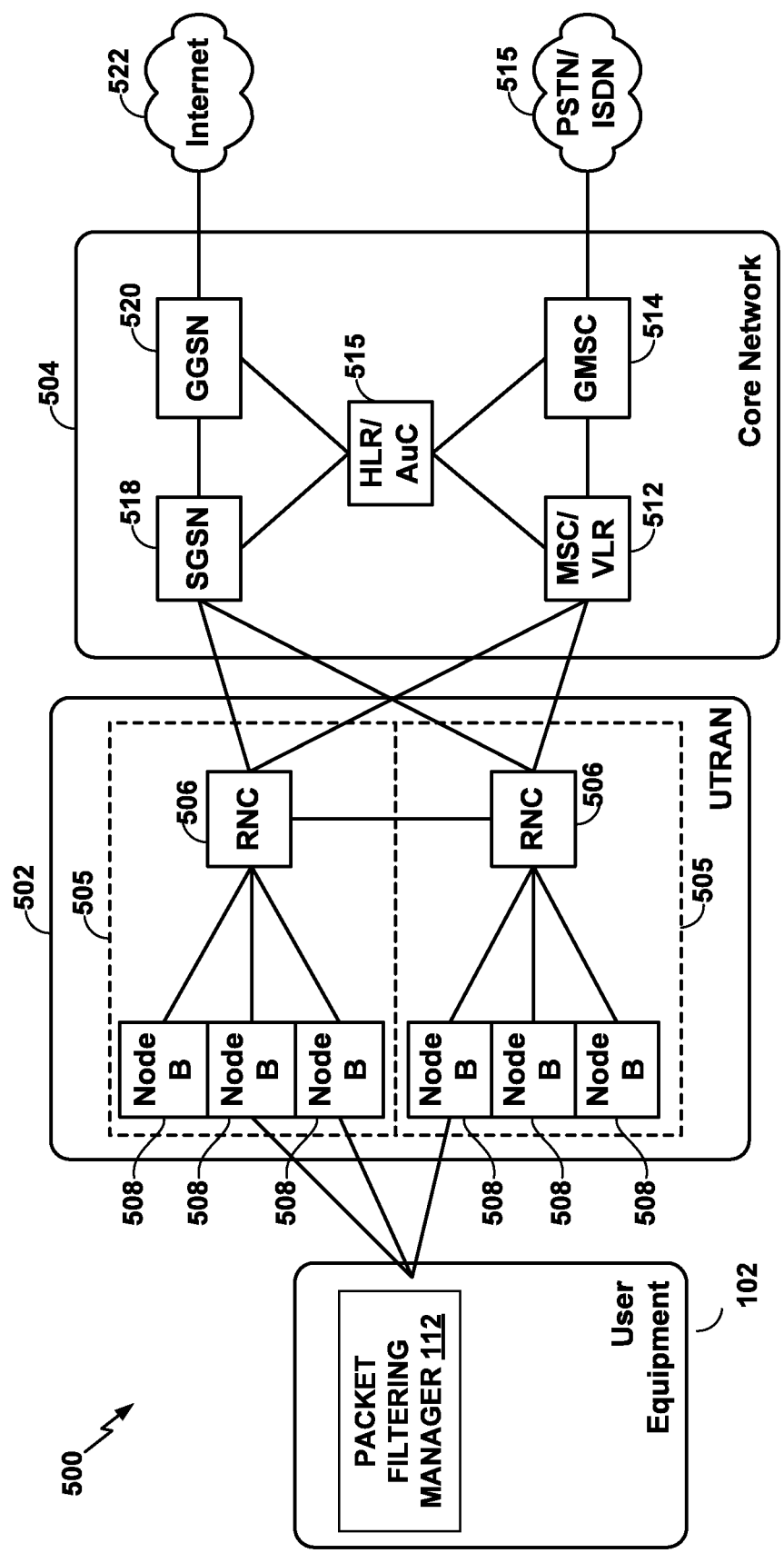
FIG. 5 is a block diagram conceptually illustrating an example of a telecommunications system including a user equipment with a packet filtering manager according to the present disclosure.

Referring to FIG. 5, by way of example and without limitation, the aspects of the present disclosure are presented with reference to a UMTS system 500 employing a W-CDMA air interface, and may include a UE 102 executing an aspect of packet filtering manager 112 and/or packet filter 114 (FIG. 1). A UMTS network includes three interacting domains: a Core Network (CN) 504, a UMTS Terrestrial Radio Access Network (UTRAN) 502, and UE 102 (FIG. 1). In an aspect, as noted, UE 102 (FIG. 1) may be configured to perform functions thereof, for example, including packet filtering manager 112 and/or packet filter 114 at the UE to save power. Further, UTRAN 502 may comprise network entity 150 and/or base station 152 (FIG. 1), which in this case may be respective ones of the Node Bs 508. In this example, UTRAN 502 provides various wireless services including telephony, video, data, messaging, broadcasts, and/or other services. The UTRAN 502 may include a plurality of Radio Network Subsystems (RNSs) such as a RNS 505, each controlled by a respective Radio Network Controller (RNC) such as an RNC 506. Here, the UTRAN 502 may include any number of RNCs 506 and RNSs 505 in addition to the RNCs 506 and RNSs 505 illustrated herein. The RNC 506 is an apparatus responsible for, among other things, assigning, reconfiguring, and releasing radio resources within the RNS 505. The RNC 506 may be interconnected to other RNCs (not shown) in the UTRAN 502 through various types of interfaces such as a direct physical connection, a virtual network, or the like, using any suitable transport network.

Communication between UE 102 and Node B 508 may be considered as including a physical (PHY) layer and a medium access control (MAC) layer. Further, communication between UE 510 and RNC 506 by way of a respective Node B 508 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in the RRC Protocol Specification, 3GPP TS 55.331 v5.1.0, incorporated herein by reference.

The geographic region covered by the RNS 505 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 508 are shown in each RNS 505; however, the RNSs 505 may include any number of wireless Node Bs. The Node Bs 508 provide wireless access points to a CN 504 for any number of mobile apparatuses, such as UE 102, and may be network entity 110 or network entity 112 of FIG. 1. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus in this case is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

For illustrative purposes, one UE 102 is shown in communication with a number of the Node Bs 508. The DL, also called the forward link, refers to the communication link from a NodeB 508 to a UE 102, and the UL, also called the reverse link, refers to the communication link from a UE 102 to a NodeB 508.

The CN 504 interfaces with one or more access networks, such as the UTRAN 502. As shown, the CN 504 is a GSM core network. However, as those skilled in the art will recognize, the various concepts presented throughout this disclosure may be implemented in a RAN, or other suitable access network, to provide UEs with access to types of CNs other than GSM networks.

The CN 504 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 504 supports circuit-switched services with a MSC 512 and a GMSC 514. In some applications, the GMSC 514 may be referred to as a media gateway (MGW). One or more RNCs, such as the RNC 506, may be connected to the MSC 512. The MSC 512 is an apparatus that controls call setup, call routing, and UE mobility functions. The MSC 512 also includes a VLR that contains subscriber-related information for the duration that a UE is in the coverage area of the MSC 512. The GMSC 514 provides a gateway through the MSC 512 for the UE to access a circuit-switched network 516. The GMSC 514 includes a home location register (HLR) 515 containing subscriber data, such as the data reflecting the details of the services to which a particular user has subscribed. The HLR is also associated with an authentication center (AuC) that contains subscriber-specific authentication data. When a call is received for a particular UE, the GMSC 514 queries the HLR 515 to determine the UE's location and forwards the call to the particular MSC serving that location.

The CN 504 also supports packet-data services with a serving GPRS support node (SGSN) 518 and a gateway GPRS support node (GGSN) 520. GPRS, which stands for General Packet Radio Service, is designed to provide packet-data services at speeds higher than those available with standard circuit-switched data services. The GGSN 520 provides a connection for the UTRAN 502 to a packet-based network 522. The packet-based network 522 may be the Internet, a private data network, or some other suitable packet-based network. The primary function of the GGSN 520 is to provide the UEs 510 with packet-based network connectivity. Data packets may be transferred between the GGSN 520 and the UEs 102 through the SGSN 518, which performs primarily the same functions in the packet-based domain as the MSC 512 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 508 and a UE 102. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 102 provides feedback to Node B 508 over the HS-DPCCH to indicate whether it correctly decoded a packet on the downlink.

HS-DPCCH further includes feedback signaling from the UE 102 to assist the Node B 508 in taking the right decision in terms of modulation and coding scheme and precoding weight selection, this feedback signaling including the CQI and PCI.

HSPA Evolved or HSPA+ is an evolution of the HSPA standard that includes MIMO and 64-QAM, enabling increased throughput and higher performance. That is, in an aspect of the disclosure, the Node B 508 and/or the UE 102 may have multiple antennas supporting MIMO technology. The use of MIMO technology enables the Node B 508 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multi-path fading and increase transmission quality, and spatial multiplexing gains to increase data throughput.

Spatial multiplexing may be used to transmit different streams of data simultaneously on the same frequency. The data steams may be transmitted to a single UE 102 to increase the data rate or to multiple UEs 102 to increase the overall system capacity. This is achieved by spatially precoding each data stream and then transmitting each spatially precoded stream through a different transmit antenna on the downlink. The spatially precoded data streams arrive at the UE(s) 102 with different spatial signatures, which enables each of the UE(s) 102 to recover the one or more the data streams destined for that UE 102. On the uplink, each UE 102 may transmit one or more spatially precoded data streams, which enables Node B 508 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
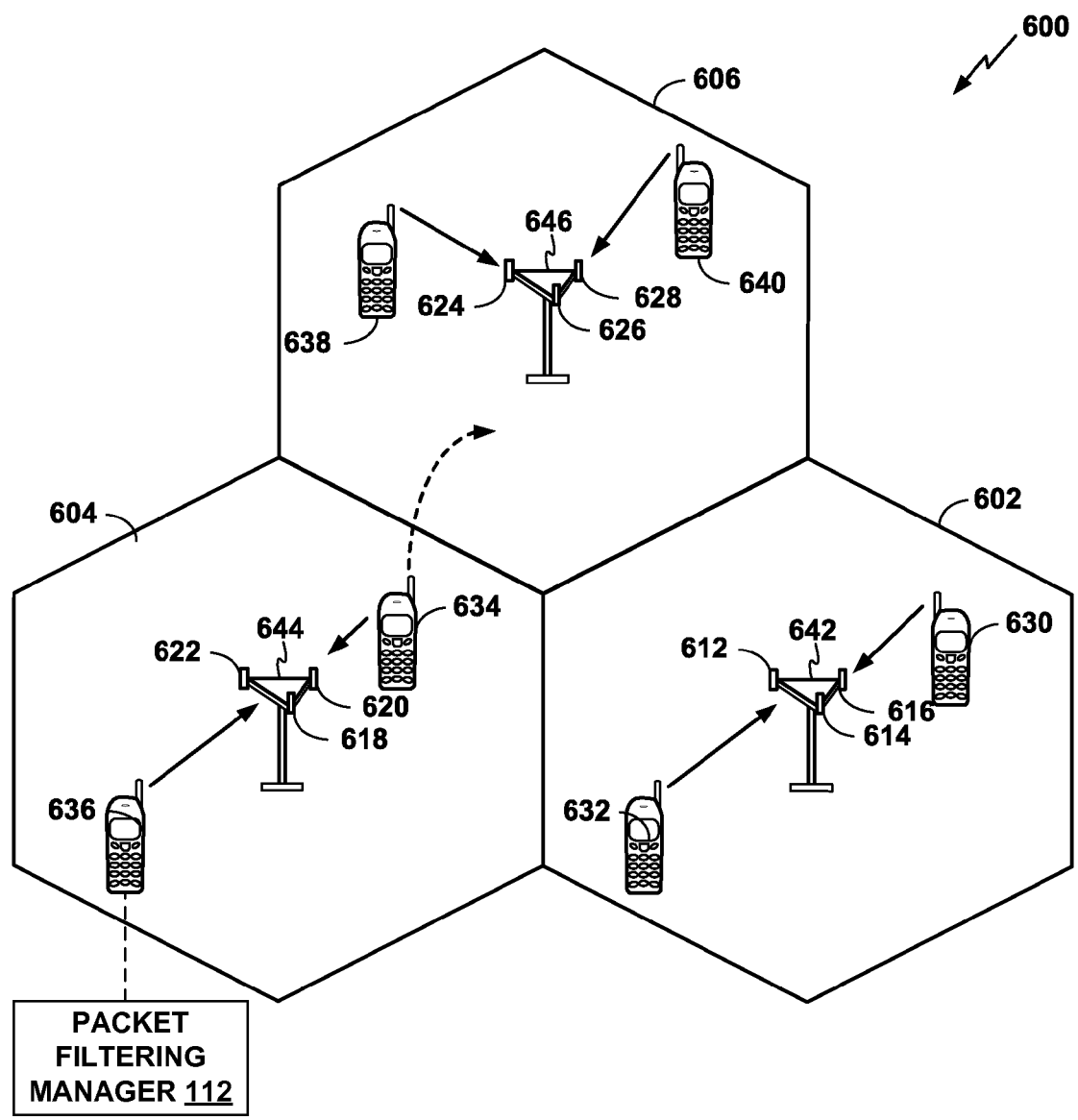
FIG. 6 is a conceptual diagram illustrating an example of an access network including a user equipment with a packet filtering manager according to the present disclosure.

Referring to FIG. 6, an access network 600 in a UTRAN architecture is illustrated, and may include one or more UEs 630, 632, 634, 636, 630, 640, which may be the same as or similar to UE 102 (FIG. 1) in that they are configured to include packet filtering manager 112 (FIGS. 1 and 3; for example, illustrated here as being associated with UE 636)

for packet filtering to save power at the UE. The multiple access wireless communication system includes multiple cellular regions (cells), including cells 602, 604, and 606, each of which may include one or more sectors. The multiple sectors can be formed by groups of antennas with each antenna responsible for communication with UEs in a portion of the cell. For example, in cell 602, antenna groups 612, 614, and 616 may each correspond to a different sector. In cell 604, antenna groups 610, 620, and 622 each correspond to a different sector. In cell 606, antenna groups 624, 626, and 610 each correspond to a different sector. UEs, for example, 630, 632, etc. may include several wireless communication devices, e.g., User Equipment or UEs, including packet filtering manager 114 of FIG. 1, which may be in communication with one or more sectors of each cell 602, 604 or 606. For example, UEs 630 and 632 may be in communication with NodeB 642, UEs 634 and 636 may be in communication with NodeB 644, and UEs 630 and 640 can be in communication with NodeB 646. Here, each NodeB 642, 644, 646 is configured to provide an access point to a CN 504 (FIG. 5) for all the UEs 630, 632, 634, 636, 630, 640 in the respective cells 602, 604, and 606. Additionally, each NodeB 642, 644, 646 and UEs 630, 632, 634, 636, 636, 640 may be UE 102 of FIG. 1 and may perform the methods outlined herein.

As the UE 634 moves from the illustrated location in cell 604 into cell 606, a serving cell change (SCC) or handover may occur in which communication with the UE 634 transitions from the cell 604, which may be referred to as the source cell, to cell 606, which may be referred to as the target cell. Management of the handover procedure may take place at the UE 634, at the Node Bs corresponding to the respective cells, at a radio network controller 506 (FIG. 5), or at another suitable node in the wireless network. For example, during a call with the source cell 604, or at any other time, the UE 634 may monitor various parameters of the source cell 604 as well as various parameters of neighboring cells such as cells 606 and 602. Further, depending on the quality of these parameters, the UE 634 may maintain communication with one or more of the neighboring cells. During this time, the UE 634 may maintain an Active Set, that is, a list of cells that the UE 634 is simultaneously connected to (i.e., the UTRA cells that are currently assigning a downlink dedicated physical channel DPCH or fractional downlink dedicated physical channel F-DPCH to the UE 634 may constitute the Active Set). In any case, UE 634 may execute reselection manager 64 to perform the reselection operations described herein.

Further, the modulation and multiple access scheme employed by the access network 600 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 1002.11 (Wi-Fi), IEEE 1002.16 (WiMAX), IEEE 1002.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
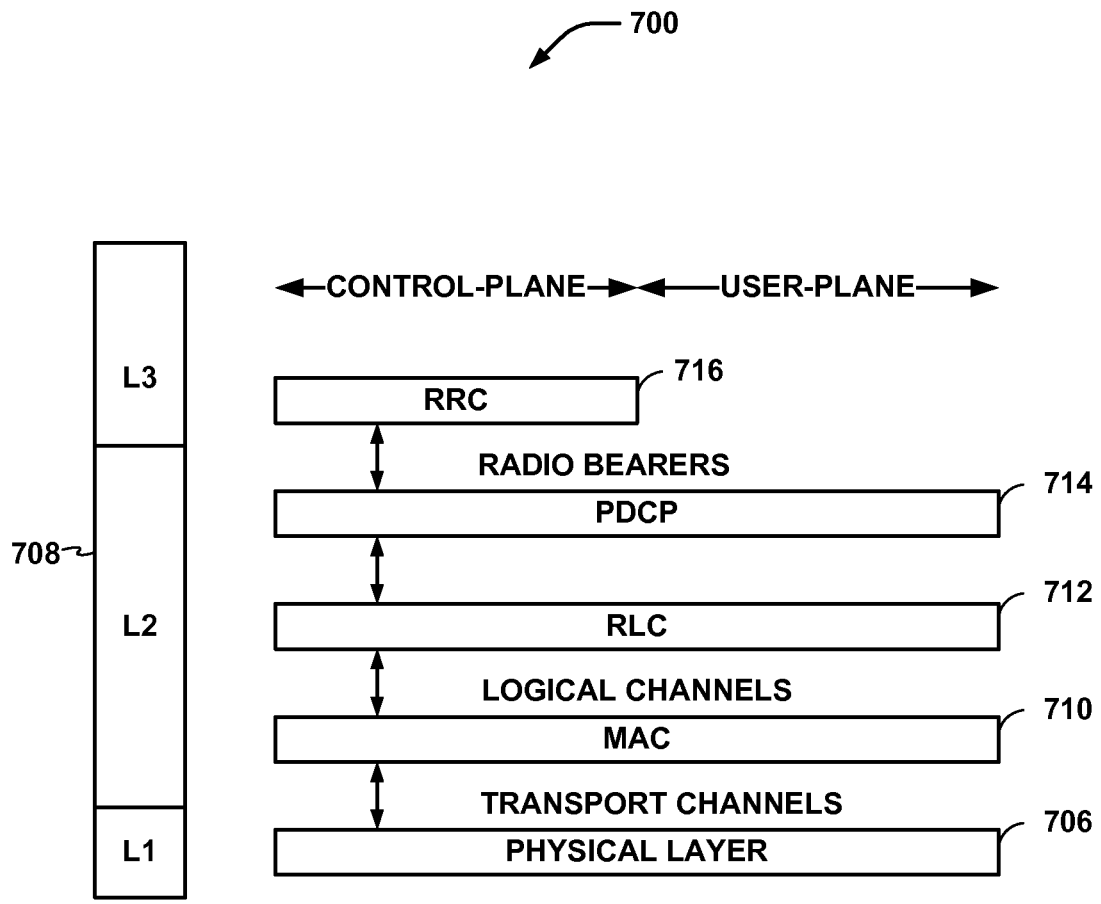
FIG. 7 is a conceptual diagram illustrating an example of a radio protocol architecture for the user and control plane that may be used by the user equipment of the present disclosure.

The radio protocol architecture may take on various forms depending on the particular application. An example for an HSPA system will now be presented with reference to FIG. 7. FIG. 7 is a conceptual diagram illustrating an example of the radio protocol architecture for the user and control planes.

Turning to FIG. 7, the radio protocol architecture for the UE, for example, UE 102 of FIG. 1 configured to include packet filtering manager 112 and/or packet filter 114 (of FIG. 1) for packet filtering to save power at a UE is shown with three layers: Layer 1, Layer 2, and Layer 3. Layer 1 is the lowest lower and implements various physical layer signal processing functions. Layer 1 will be referred to herein as the physical layer 706. Layer 2 (L2 layer) 708 is above the physical layer 706 and is responsible for the link between the UE and node B over the physical layer 706.

In the user plane, L2 layer 708 includes a media access control (MAC) sublayer 710, a radio link control (RLC) sublayer 712, and a packet data convergence protocol (PDCP) 714 sublayer, which are terminated at the node B on the network side. Although not shown, the UE may have several upper layers above L2 layer 708 including a network layer (e.g., IP layer) that is terminated at a PDN gateway on the network side, and an application layer that is terminated at the other end of the connection (e.g., far end UE, server, etc.).

The PDCP sublayer 714 provides multiplexing between different radio bearers and logical channels. The PDCP sublayer 714 also provides header compression for upper layer data packets to reduce radio transmission overhead, security by ciphering the data packets, and handover support for UEs between NodeBs. The RLC sublayer 712 provides segmentation and reassembly of upper layer data packets, retransmission of lost data packets, and reordering of data packets to compensate for out-of-order reception due to hybrid automatic repeat request (HARQ). The MAC sublayer 710 provides multiplexing between logical and transport channels. The MAC sublayer 710 is also responsible for allocating the various radio resources (e.g., resource blocks) in one cell among the UEs. The MAC sublayer 710 is also responsible for HARQ operations.

Figure 8:
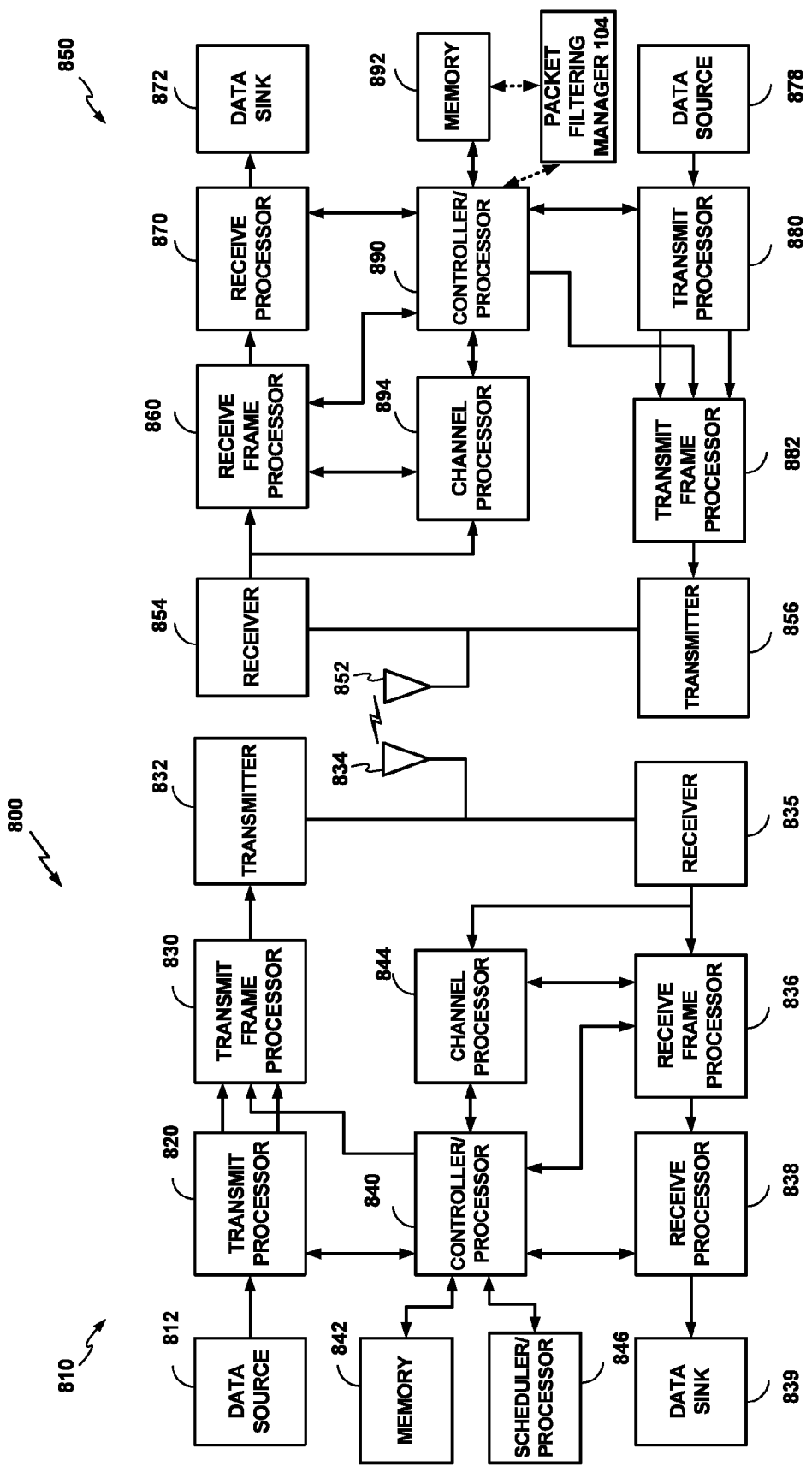
FIG. 8 is a block diagram conceptually illustrating an example of a NodeB in communication with a UE, which includes a packet filtering manager according to the present disclosure, in a telecommunications system.

FIG. 8 is a block diagram of a NodeB 810 in communication with a UE 850, where the NodeB 810 may be base station 152 of network entity 150, and/or the UE 850 may be the same as or similar to UE 102 of FIG. 1 in that it is configured to include packet filtering manager 112 and/or packet filter 114 (of FIG. 1) for packet filtering to save power at a UE, in controller/processor 890. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 850. The receive processor 850 then performs the inverse of the processing performed by the transmit processor 820 in the NodeB 88. More specifically, the receive processor 850 descrambles and de-spreads the symbols, and then determines the most likely signal constellation points transmitted by the NodeB 88 based on the modulation scheme. These soft decisions may be based on channel estimates computed by the channel processor 894. The soft decisions are then decoded and de-interleaved to recover the data, control, and reference signals. The CRC codes are then checked to determine whether the frames were successfully decoded. The data carried by the successfully decoded frames will then be provided to a data sink 852, which represents applications running in the UE 850 and/or various user interfaces (e.g., display). Control signals carried by successfully decoded frames will be provided to a controller/processor 890. When frames are unsuccessfully decoded by the receiver processor 850, the controller/processor 890 may also use an acknowledgement (ACK) and/or negative acknowledgement (NACK) protocol to support retransmission requests for those frames.

In the uplink, data from a data source 858 and control signals from the controller/processor 890 are provided to a transmit processor 880. The data source 858 may represent applications running in the UE 850 and various user interfaces (e.g., keyboard). Similar to the functionality described in connection with the downlink transmission by the NodeB 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the NodeB 88 or from feedback contained in the midamble transmitted by the NodeB 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the NodeB 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the NodeB 810 and the UE 850, respectively. For example, the controller/processors 840 and 890 may provide various functions including timing, peripheral interfaces, voltage regulation, power management, and other control functions. The computer readable media of memories 842 and 892 may store data and software for the NodeB 810 and the UE 850, respectively. A scheduler/processor 846 at the NodeB 88 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

As noted above, such as with reference to FIGS. 1, 3 and 5, the above described managers, components, and other above described elements may be implemented in hardware, software, or a combination thereof. Further, as noted, one or more processors may be used to implement these various managers, components, and other elements in hardware, software or a combination thereof. For example, when implemented in software, one or more processors may be used to execute such software. Examples of processors include microprocessors, microcontrollers, digital signal processors (DSPs), field programmable gate arrays (FP- GAs), programmable logic devices (PLDs), state machines, gated logic, discrete hardware circuits, and other suitable hardware configured to perform the various functionality described throughout this disclosure. Further, as previously noted, one or more processors may be used to execute software implementing the above described managers, components, and/or other elements. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of packet filtering to save power at a user equipment (UE), comprising:
   receiving, at a modem processor (MP) of the UE, a packet filtering configuration message from an application processor (AP) at the UE, wherein the AP is in communication with the MP, and wherein the packet filtering configuration message includes one or more packet filtering rules for filtering packets associated with one or more applications;
   configuring a packet filter at the MP based at least on the one or more packet filtering rules received in the packet filtering configuration message, wherein the configured packet filter is initially disabled upon configuration; and
   enabling the configured packet filter at the MP in response to receiving an indication from the AP that the AP entered a low power or sleep mode,
   wherein the enabled packet filter allows or drops a packet based on the packet filtering rules.

2. The method of claim 1, further comprising:
   disabling the enabled packet filter after a packet is allowed to pass through the enabled packet filter to the AP.

3. The method of claim 1, further comprising:
   allowing a packet to pass from the MP to the AP when the packet satisfies at least one rule of the one or more packet filtering rules of the enabled packet filter.

4. The method of claim 1, further comprising:
   dropping a packet at the MP when the packet fails to satisfy at least one rule of the one or more packet filtering rules of the enabled packet filter.

5. The method of claim 1, further comprising:
   initiating a first timer (T1) at the MP for computing a time period of data inactivity after an unwanted packet received over a data session is dropped at the MP and a second timer (T2) at the MP for computing a time period after establishing the data session between the MP and a network entity for receiving the unwanted packet, wherein the first timer is configured to a first value and the second timer is configured to a second value and wherein the first value is less than the second value; and
   releasing radio frequency (RF) resources associated with the data session upon expiration of the first timer.

6. The method of claim 5, further comprising:
   terminating the data session associated with the data session upon expiration of the second timer.

7. The method of claim 1, wherein the packet filtering rules at the MP are updated based on a later packet filtering configuration message received from the AP.

8. An apparatus for packet filtering to save power at a user equipment (UE), comprising:
   means for receiving, at a modem processor (MP) of the UE, a packet filtering configuration message from an application processor (AP) at the UE, wherein the AP in communication with the MP, and wherein the packet filtering configuration message includes one or more packet filtering rules for filtering packets associated with one or more applications;
   means for configuring a packet filter at the MP based at least on the one or more packet filtering rules received in the packet filtering configuration message, wherein the configured packet filter is initially disabled upon configuration; and means for enabling the configured packet filter at the MP in response to receiving an indication from the AP that the AP entered a low power or sleep mode, wherein the enabled packet filter allows or drops a packet based on the packet filtering rules.

9. The apparatus for claim 8, further comprising:
means for disabling the enabled packet filter when after a packet is allowed to pass through the enabled packet filter to the AP.

10. The apparatus for claim 8, further comprising:
means for allowing a packet to pass from the MP to the AP when the packet satisfies at least one rule of the one or more packet filtering rules of the enabled packet filter.

11. The apparatus for claim 8, further comprising:
means for dropping a packet at the MP when the packet fails to satisfy at least one rule of the one or more packet filtering rules of the enabled packet filter.

12. The apparatus for claim 8, further comprising:
means for initiating a first timer (T1) at the MP for computing a time period of data inactivity after an unwanted packet received over a data session is dropped at the MP and a second timer (T2) at the MP for computing a time period after establishing the data session between the MP and a network entity for receiving the unwanted packet, wherein the first timer is configured to a first value and the second timer is configured to a second value and wherein the first value is less than the second value; and
means for releasing radio frequency (RF) resources associated with the data session upon expiration of the first timer.

13. The apparatus for claim 12, further comprising:
means for terminating the data session associated with the data session upon expiration of the second timer.

14. The apparatus for claim 8, wherein the packet filtering rules at the MP are updated based on a later packet filtering configuration message received from the AP.

15. A non-transitory computer readable medium storing computer executable code for packet filtering to save power at a user equipment (UE), comprising:
code for receiving, at a modem processor (MP) of the UE, a packet filtering configuration message from an application processor (AP) at the UE, wherein the AP is in communication with the MP, and wherein the packet filtering configuration message includes one or more packet filtering rules for filtering packets associated with one or more applications;
code for configuring a packet filter at the MP based at least on the one or more packet filtering rules received in the packet filtering configuration message, wherein the configured packet filter is initially disabled upon configuration; and
code for enabling the configured packet filter at the MP in response to receiving an indication from the AP that the AP entered a low power or sleep mode,
wherein the enabled packet filter allows or drops a packet based on the packet filtering rules.

16. The computer readable medium of claim 15, further comprising:
code for disabling the enabled packet filter after a packet is allowed to pass through the enabled packet filter to the AP.

17. The computer readable medium of claim 15, further comprising:
code for allowing a packet to pass from the MP to the AP when the packet satisfies at least one rule of the one or more packet filtering rules of the enabled packet filter.

18. The computer readable medium of claim 15, further comprising:
code for dropping a packet at the MP when the packet fails to satisfy at least one rule of the one or more packet filtering rules of the enabled packet filter.

19. The computer readable medium of claim 15, further comprising:
code for initiating a first timer (T1) at the MP for computing a time period of data inactivity after an unwanted packet received over a data session is dropped at the MP and a second timer (T2) at the MP for computing a time period after establishing the data session between the MP and a network entity for receiving the unwanted packet, wherein the first timer is configured to a first value and the second timer is configured to a second value and wherein the first value is less than the second value; and
code for releasing radio frequency (RF) resources associated with the data session upon expiration of the first timer.

20. The computer readable medium of claim 19, further comprising:
code for terminating the data session associated with the data session upon expiration of the second timer.

21. The computer readable medium of claim 15, wherein the packet filtering rules at the MP are updated based on a later packet filtering configuration message received from the AP.

22. A user equipment (UE) for wireless communications, comprising:
a memory; and
at least one processor coupled to the memory, and wherein the processor is configured to:
receive, at a modem processor (MP) of the UE, a packet filtering configuration message from an application processor (AP) at the UE, wherein the AP is in communication with the MP, and wherein the packet filtering configuration message includes one or more packet filtering rules for filtering packets associated with one or more applications;
configure a packet filter at the MP based at least on the one or more packet filtering rules received in the packet filtering configuration message, wherein the configured packet filter is initially disabled upon configuration; and
enable the configured packet filter at the MP in response to receiving an indication from the AP that the AP entered a low power or sleep mode,
wherein the enabled packet filter allows or drops a packet based on the packet filtering rules.

23. The UE of claim 22, wherein the processor is further configured to:
disable the enabled packet filter after a packet is allowed to pass through the enabled packet filter to the AP.

24. The UE of claim 22, wherein the processor is further configured to:
a packet allowing component to allow a packet to pass from the MP to the AP when the packet satisfies at least one rule of the one or more packet filtering rules of the enabled packet filter.

25. The UE of claim 22, wherein the processor is further configured to:

a packet dropping component to drop a packet at the MP when the packet fails to satisfy at least one rule of the one or more packet filtering rules of the enabled packet filter.

26. The UE of claim 22, wherein the processor is further configured to:
a timer initiating component to initiate a first timer (T1) at the MP for computing a time period of data inactivity after an unwanted packet received over a data session is dropped at the MP and a second timer (T2) at the MP for computing a time period after establishing the data session between the MP and a network entity for receiving the unwanted packet, wherein the first timer is configured to a first value and the second timer is configured to a second value and wherein the first value is less than the second value; and
a resource release component to release radio frequency (RF) resources associated with the data session upon expiration of the first timer.

27. The UE of claim 26, wherein the processor is further configured to:
a data session terminating component to terminate the data session associated with the data session upon expiration of the second timer.

28. The UE of claim 22, wherein the processor is further configured to update the packet filtering rules at the MP based on a later packet filtering configuration message received from the AP.

* * * * *